No. 655,451. Patented Aug. 7, 1900.
E. W. McCASLIN.
VALVE FOR PNEUMATIC TIRES.
(Application filed Nov. 22, 1899.)
(No Model.)
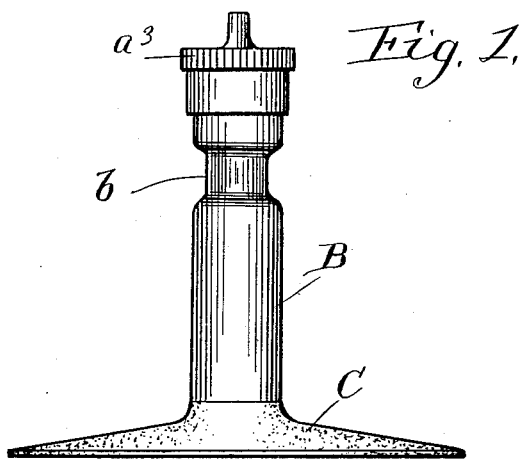
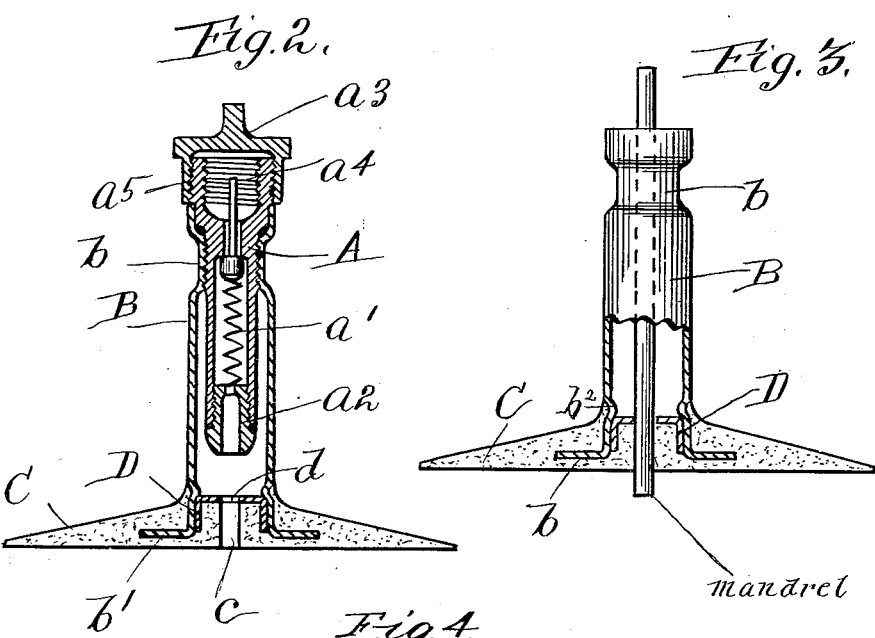
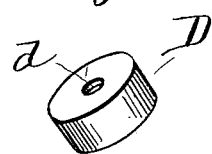
Witnesses:
Inventor,
Elton W. McCaslin
by Chas. L. Page Atty.

UNITED STATES PATENT OFFICE.

ELTON W. McCASLIN, OF CHICAGO, ILLINOIS, ASSIGNOR TO THE MORGAN & WRIGHT, OF SAME PLACE.

VALVE FOR PNEUMATIC TIRES.

SPECIFICATION forming part of Letters Patent No. 655,451, dated August 7, 1900.

Application filed November 22, 1899. Serial No. 737,924. (No model.)

*To all whom it may concern:*

Be it known that I, ELTON W. MCCASLIN, of Chicago, county of Cook, State of Illinois, have invented a certain new and useful Improvement in Valves for Pneumatic Tires, of which the following is a specification.

My invention relates to valve devices for inflatable tires, and particularly to a construction involving a molded rubber base or cot by which the device is secured to the tire.

My invention contemplates a valve shell or casing having its base provided with a molded rubber cot and having also a thimble inserted in its base. The end wall of said thimble is provided with a small opening, and the rubber, which extends into and fills the hollow of the thimble, is provided with a passage which registers with said opening. In this way the valve shell or casing is provided with a suitable passage through which the air is pumped into the tire, and at the same time the shell and cot are effectively fastened together.

In the accompanying drawings, Figure 1 is a side elevation of a valve device constructed in accordance with my invention. Fig. 2 is a central longitudinal section of the same. Fig. 3 is a view illustrating the manner in which the cot is molded upon the base of the shell or casing and showing the mandrel employed for making an opening in the rubber. Fig. 4 is a perspective of the thimble which I insert in the base of the shell.

The particular form of valve in connection with which I have illustrated my invention comprises a valve-casing A, a valve $a$, a spring $a'$, and a threaded plug $a^2$, the latter being screwed into the inner end of said casing. A cap $a^3$ is screwed upon the outer end of the casing A, and the latter is preferably internally threaded at $a^4$ and also externally at $a^5$. The external threading of the casing A permits it to be screwed into the neck or contracted portion $b$ of the outer shell or casing B. This outer shell or casing B is preferably provided at its base with a flange $b'$, and molded upon and about this flange is a rubber cot C.

The thimble D, which is inserted and expanded within the base of the shell B, is provided with an opening $d$, and the rubber, which extends within and fills the hollow of the said thimble, is provided with a passage $c$. This passage $c$ registers with the opening $d$ in the end wall of the thimble, and the passage thus provided affords an opening through which the air is pumped into the tire. The face of the cot can be cemented to the air-tube of the tire in the usual manner, and the tire can of course be inflated by screwing a pump-nipple into the outer end of the casing A.

Any suitable device or means may be employed for providing the cot with the passage $c$; but as a simple method I temporarily insert a mandrel through the opening $d$ in the thimble and then mold the rubber about the mandrel and casing, as shown in Fig. 3. The thimble D serves to prevent the rubber from extending an objectionable distance within the shell or casing B, and by allowing the rubber to fill the hollow of the thimble I make the joint air-tight and effectually fasten the cot and shell together. An inwardly-projecting bead $b^2$ is preferably formed upon the inner surface of the outer shell or casing B, the said bead serving as a stop to limit the insertion of the thimble.

What I claim as my invention is—

1. A valve device for pneumatic tires comprising an outer shell or casing into which the valve-casing proper is screwed and which is provided with a flanged base, a rubber cot molded upon said flanged base, and a thimble secured within the base of said outer shell or casing and having its interior filled with the rubber of said cot, the thimble being provided with an opening which registers with an opening in the rubber.

2. The combination of a metal shell having a flanged base, a rubber cot molded upon said flanged base, and a metal thimble inserted and expanded within the base of said shell, the rubber of the cot filling the thimble and said rubber filling and thimble having a passage therethrough, substantially as described.

ELTON W. McCASLIN.

Witnesses:
ARTHUR F. DURAND,
AGNES A. DEVINE.